UNITED STATES PATENT OFFICE.

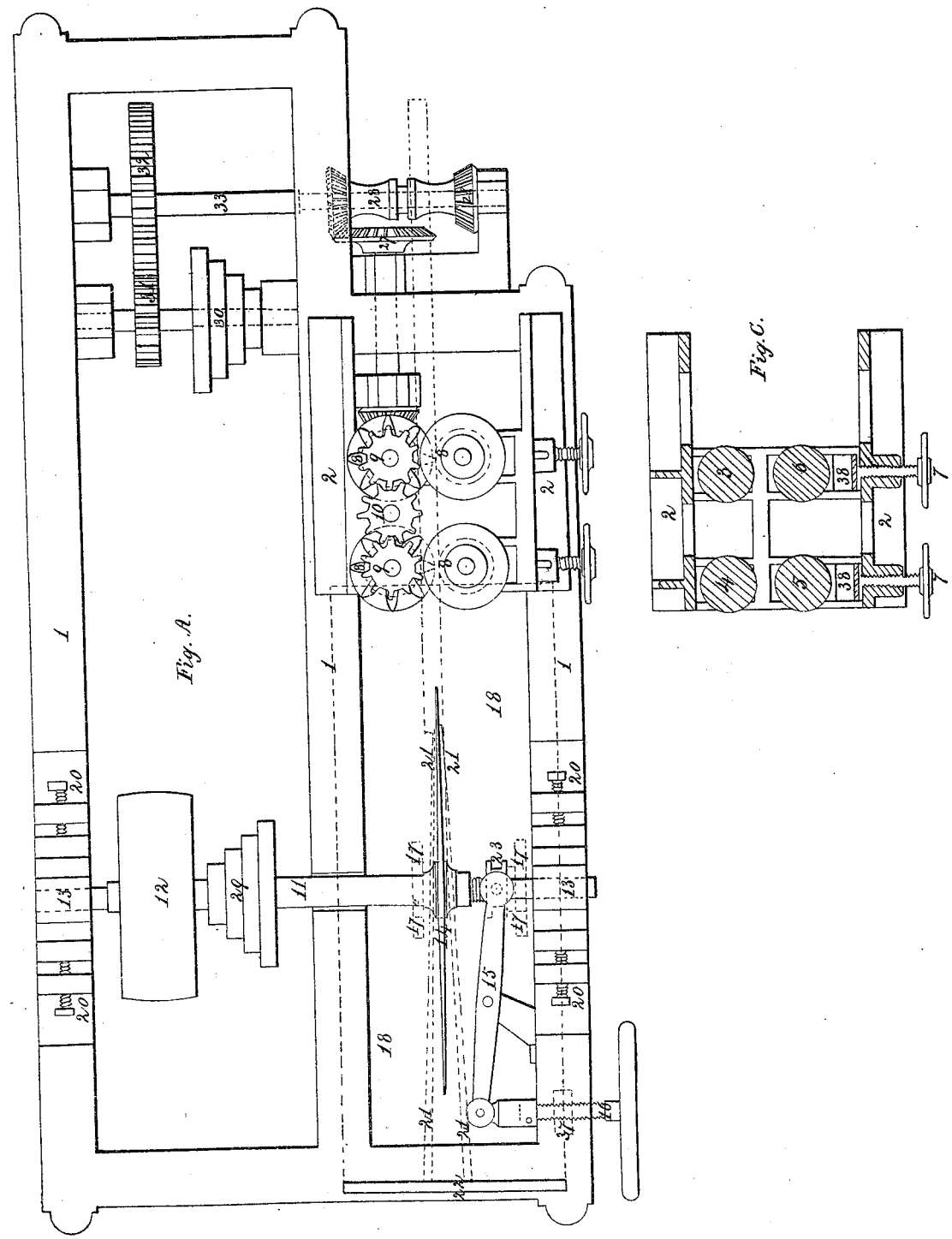

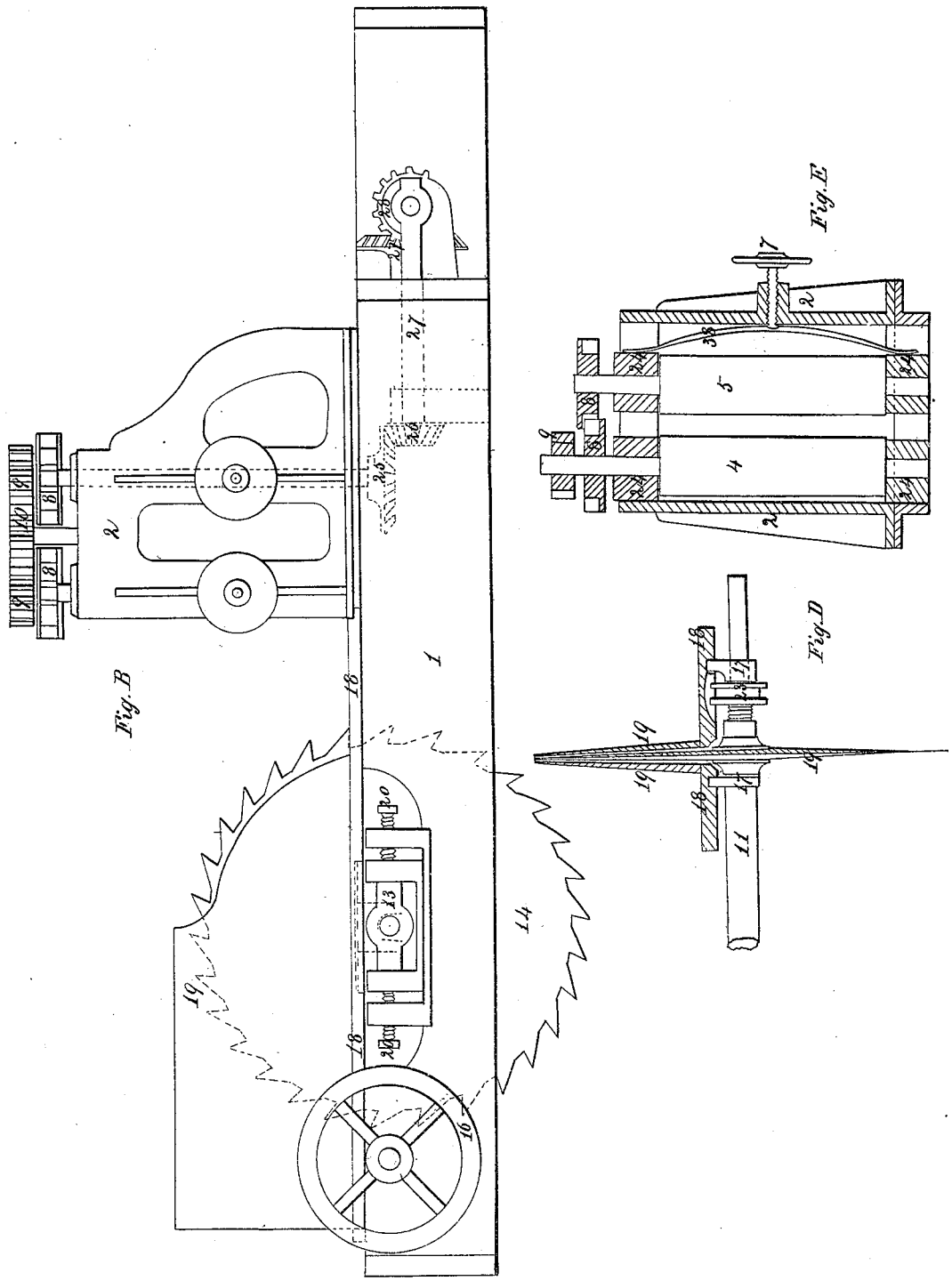

WM. D. LEAVITT, OF CINCINNATI, OHIO.

SAWING-MACHINE.

Specification of Letters Patent No. 15,012, dated June 3, 1856.

*To all whom it may concern:*

Be it known that I, WILLIAM D. LEAVITT, of the city of Cincinnati, in the county of Hamilton and State of Ohio, have invented a new and useful Improvement in Machines for Resawing Lumber; and I do hereby declare that the following is a full and exact description thereof, reference being had to the accompanying drawings, forming part of this specification, and to the letters and figures of reference marked thereon.

Similar figures refer to corresponding parts of the improvement.

I am aware of machinery having been before constructed for re-sawing lumber, which was provided with rollers for presenting and forcing the lumber to the saw while in operation, and the said rollers in said machines were made adjustable laterally to the saw, by moving and adjusting which the required thickness of lumber was obtained, the distance between a line drawn parallel with the saw, and the rollers being the thickness of the lumber sawed.

The nature of my improvement consists in means for moving the saw, or adjusting it to the rollers, (instead of adjusting the rollers to the saw) so as to be enabled to saw any thickness of lumber which may be required, and the arrangement of machinery which I employ for the purpose is simple in its construction, easy of access, and is not liable to derangement from use; the saw, also, can be adjusted in a moment's time to suit any thickness of lumber desired and is easily operated.

To enable others skilled in the art to make and use my improvement, I will proceed to describe its construction and operation by referring direct to the accompanying drawings.

Figure A, represents a top view of the machine. Fig. B, shows a side elevation of the same. Fig. C, is a horizontal sectional view of the frame and rollers used for presenting the lumber to the saw. Fig. D, is a separate view of part of the saw shaft, and a transverse section of the table showing how it is attached to the saw shaft to be moved with the saw when the saw is adjusted to the rollers. Fig. E, is a longitudinal sectional elevation of the roller frame, in line with the axes of the front rollers.

The frame work of the machine 1, 1, is constructed of wood.

2, 2, represents the metal frame work containing the rollers 3, 4, 5 and 6, used for presenting the lumber to the saw 14. The rollers receive their motion from a pulley 29, (on the saw-shaft 11,) by means of a belt working around the pulley 30 on the counter shaft, which counter shaft is provided with a pinion 31 working into a wheel 32 on the shaft 33 which imparts motion to the wheel and shaft 27 by the double pinion 28 on the shaft 33. And the shaft 27 is provided with a bevel pinion 26 which works into a bevel wheel 25 on the lower end of the roller 3, (a section of which roller can be seen in Fig. C,) and thereby gives each of the rollers 3, 4, 5, and 6 their required motion by means of the pinions 9, 9 and counter pinion 10 which serves to transfer motion to the two front rollers 4 and 5. The epicycloid wheels 8 are used to give motion to the rollers 5 and 6, which are adjusted by the screw 7 and spring 38, to suit the thickness of lumber passed between the rollers. The rollers 4, 5, 6 and 3 are kept sufficiently close so as to clamp the lumber and present it to the saw by the motion of the rollers. The wheels 8 are furnished with long teeth, in order to allow the rollers to work at the greatest possible distance apart for admitting large pieces of lumber between the rollers to be presented to the saw. The saw shaft receives its motion by means of a belt working around the pulley 12.

13, are bearings for the saw shaft at each end, and the frames in which they work are provided with adjusting screws 20, wheel 16, lever 15 and flanges 23 on saw shaft 11, used for moving the saw-shaft and saw longitudinally, in order to adjust the saw to a proper position relatively with the stationary rollers 3 and 4 for sawing the desired thickness of lumber.

The spindle to which the wheel 16 is attached is provided with a screw thread and works in a nut 37, (shown in Fig. A). Said nut is let into the frame, and in practice will be made so as to adjust itself to the various positions of the lever 15.

The table 18, the outlines of which are denoted by dotted lines in Fig. A, is connected to the saw-shaft 11, by means of forked pieces of metal 17, 17, attached to the under part of the frame fitted in slides and straddling down over the shaft. The side of one of said forked pieces works agains the collar of the saw as shown in Fig. D, and the other forked piece works against the outside of the flange used for adjusting the saw shaft. The table is attached to the saw shaft in the manner specified for the purpose of moving it with the saw when it is adjusted to the rollers.

21, 21, are flanges on each side of the saw, which are attached to the table 18, in order to prevent the lumber from coming in contact with the saw, and thereby prevent friction, which would otherwise occur, providing the lumber, while being sawed, was allowed to rub against the saw.

In this mill the saw is made tapering from its center to the circumference. This is done to accomplish two advantages: firstly to stiffen the saw, and secondly to have it as thin as possible at the edge, in order to cut very little from the lumber as it is sawed. There will be a lever applied to the double pinion shaft 28, in order to throw it out of gear, to prevent the rollers from feeding lumber to the saw, when required; or if it is desired to run the plank back, after it has been fed it can be readily done, by reversing the motion of the feed by means of one of the wheels 28 being thrown out and the other thrown into gear—the operation of which the drawings will readily explain.

24, are boxes in which the feed rollers 3, 4, 5, and 6, work, in the frame 2, 2. The boxes in which the rollers 3 and 4 work are made stationary, while those in which the rollers 5 and 6 work, are made to slide laterally in order to adjust these roller apart to suit the thickness of lumber being passed through to be sawed.

The forked pieces of metal 17, 17, attached to sliding grooves on the under part of the table 18, are used for moving the table laterally with the saw as it is adjusted to the stationary feed rollers 3 and 4, and the flaring flanges 21, being attached to the table move with the saw and are kept the proper distance from the saw while in motion. The forked pieces 17 are fitted into longitudinal grooved pieces attached to the under part of saw-table 18, said grooves being long enough to allow for a proper adjustment of the table.

I disclaim moving the saw laterally for gaging the thickness of the board to be cut; as such is not new, but What I do claim as new and of my own invention and desire to secure by Letters Patent, is—

The herein specified arrangement of devices for effecting that purpose, when combined with the mechanism described for setting the saw forward in its own plane, as hereinbefore set forth.

WILLIAM D. LEAVITT.

Witnesses:
MARTIN BENSON,
L. W. SMITH.